United States Patent
Li et al.

(10) Patent No.: US 10,637,976 B2
(45) Date of Patent: *Apr. 28, 2020

(54) HOUSING, METHOD FOR MANUFACTURING HOUSING, AND MOBILE TERMINAL HAVING HOUSING

(71) Applicant: Guangdong Oppo Mobile Telecommunications Corp., Ltd., Dongguan, Guangdong (CN)

(72) Inventors: Jing Li, Guangdong (CN); Guangming Yang, Guangdong (CN); Qingguo Gong, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,966

(22) Filed: Aug. 3, 2017

(65) Prior Publication Data

US 2018/0041616 A1 Feb. 8, 2018

(30) Foreign Application Priority Data

Aug. 8, 2016 (CN) .......................... 2016 1 0643272
Aug. 8, 2016 (CN) ...................... 2016 2 0854528 U

(51) Int. Cl.
*H04M 1/02* (2006.01)
*B32B 27/06* (2006.01)
(Continued)

(52) U.S. Cl.
CPC ............. *H04M 1/0249* (2013.01); *B32B 7/12* (2013.01); *B32B 27/06* (2013.01); *B32B 37/12* (2013.01);
(Continued)

(58) Field of Classification Search
CPC . H04M 1/0249; H04M 1/02; B32B 2309/105; B32B 38/145; B32B 27/06;
(Continued)

(56) References Cited

U.S. PATENT DOCUMENTS 7,053,848 B2 * 5/2006 Shoji ...................... H01Q 1/243
343/702
8,180,411 B2 * 5/2012 Skagmo ............ B29C 45/14065
361/679.34
(Continued)

FOREIGN PATENT DOCUMENTS

CN 104580585 A 4/2015
CN 105322290 A 2/2016
(Continued)

OTHER PUBLICATIONS

Extended European Search Report issued in corresponding European application No. 17184792.4 dated Jan. 8, 2018.
(Continued)

*Primary Examiner* — Pablo N Tran
(74) *Attorney, Agent, or Firm* — Young Basile Hanlon & MacFarlane, P.C.

(57) ABSTRACT

A housing for a mobile terminal, a method for manufacturing the housing, and a mobile terminal having the housing are provided. The housing includes a substrate made of metal, at least one slot penetrating through the substrate in a thickness direction of the substrate, and a filling layer received in the at least one slot. The filling layer includes an insulating sub-layer and a printed sub-layer located on the insulating sub-layer.

12 Claims, 3 Drawing Sheets

(51) Int. Cl.
*B32B 7/12* (2006.01)
*B32B 38/00* (2006.01)
*B32B 37/12* (2006.01)

(52) U.S. Cl.
CPC ......... *B32B 38/145* (2013.01); *H04M 1/0283* (2013.01); *B32B 2309/105* (2013.01)

(58) Field of Classification Search
CPC ........... B32B 37/12; B32B 38/00; B32B 7/12; H05K 5/02; H05K 5/04
See application file for complete search history.

(56) References Cited

U.S. PATENT DOCUMENTS

| | | | | |
|---|---|---|---|---|
| 8,373,610 | B2* | 2/2013 | Chiang | H01Q 1/243 343/770 |
| 8,667,661 | B2* | 3/2014 | Filson | B32B 15/012 228/117 |
| 8,975,540 | B2 | 3/2015 | Mareno et al. | |
| 9,166,279 | B2* | 10/2015 | Jin | H01Q 1/243 |
| 9,716,307 | B2* | 7/2017 | Tsai | H01Q 13/106 |
| 9,729,207 | B2 | 8/2017 | Hwang | |
| 9,774,072 | B2* | 9/2017 | Chung | H01Q 1/243 |
| 9,904,077 | B2* | 2/2018 | Park | G02F 1/0102 |
| 9,907,191 | B2* | 2/2018 | Shi | H05K 5/0004 |
| 10,205,225 | B2 | 2/2019 | Ha et al. | |
| 10,263,334 | B2* | 4/2019 | Hu | H01Q 1/36 |
| 10,367,926 | B2 | 7/2019 | Wu et al. | |
| 10,389,857 | B2 | 8/2019 | Sun et al. | |
| 10,411,358 | B2 | 9/2019 | Zhao et al. | |
| 10,446,921 | B2* | 10/2019 | Zhao | C23F 1/32 |
| 2007/0160762 | A1* | 7/2007 | Chaug | B44C 1/1729 427/256 |
| 2009/0239068 | A1 | 9/2009 | Shi et al. | |
| 2010/0097276 | A1 | 4/2010 | Lin et al. | |
| 2012/0009884 | A1* | 1/2012 | Rao | H01Q 1/243 455/73 |
| 2012/0268343 | A1* | 10/2012 | Yanagi | H01Q 1/526 343/872 |
| 2013/0017867 | A1* | 1/2013 | Lee | H01Q 1/243 455/566 |
| 2013/0141885 | A1* | 6/2013 | Gu | H01Q 1/243 361/774 |
| 2013/0280550 | A1 | 10/2013 | Huang et al. | |
| 2014/0015724 | A1* | 1/2014 | Bungo | H01Q 13/10 343/767 |
| 2014/0111388 | A1* | 4/2014 | Di Nallo | H01Q 1/2266 343/702 |
| 2014/0247188 | A1* | 9/2014 | Nakano | H01Q 1/243 343/702 |
| 2015/0070224 | A1* | 3/2015 | Nakano | H01Q 1/2225 343/702 |
| 2015/0357716 | A1* | 12/2015 | Chen | H04B 5/0081 343/702 |
| 2016/0056527 | A1* | 2/2016 | Pascolini | G06K 9/00006 343/702 |
| 2016/0072337 | A1* | 3/2016 | Chang | H02J 50/80 320/108 |
| 2016/0088131 | A1* | 3/2016 | Chiu | H04M 1/026 455/575.8 |
| 2016/0112551 | A1* | 4/2016 | Hung | H04B 1/0458 455/575.7 |
| 2016/0164178 | A1* | 6/2016 | Komachi | H01Q 1/38 343/702 |
| 2016/0165018 | A1* | 6/2016 | Ettel | H01Q 1/42 455/575.7 |
| 2016/0190690 | A1 | 6/2016 | Badran et al. | |
| 2016/0255184 | A1* | 9/2016 | Hwang | H04B 5/0031 455/41.1 |
| 2017/0104259 | A1* | 4/2017 | Yosui | H01Q 1/2208 |
| 2017/0142241 | A1* | 5/2017 | Kim | H01Q 5/385 |
| 2017/0149118 | A1* | 5/2017 | Wang | H01Q 1/243 |
| 2018/0090819 | A1 | 3/2018 | Wang et al. | |
| 2018/0366811 | A1 | 12/2018 | Huang et al. | |
| 2019/0027813 | A1 | 1/2019 | Wang | |
| 2019/0342431 | A1 | 11/2019 | Li et al. | |

FOREIGN PATENT DOCUMENTS

| | | |
|---|---|---|
| CN | 105517389 A | 4/2016 |
| CN | 105530784 A | 4/2016 |
| CN | 105644062 A | 6/2016 |
| CN | 105655689 A | 6/2016 |
| CN | 105682401 A | 6/2016 |
| CN | 105744810 A | 7/2016 |
| CN | 105813422 A | 7/2016 |
| CN | 106132149 A | 11/2016 |
| CN | 106299599 A | 1/2017 |
| CN | 205883339 U | 1/2017 |
| EP | 1950834 A1 | 7/2008 |
| EP | 3282676 A1 | 2/2018 |
| KR | 20110101350 A | 9/2011 |
| WO | 2011051408 A1 | 5/2011 |
| WO | 2015035890 A1 | 3/2015 |
| WO | 2018028372 A1 | 2/2018 |

OTHER PUBLICATIONS

International Search Report issued in corresponding international application No. PCT/CN2017/09559 dated Oct. 10, 2017.
International search report issued in corresponding international application No. PCT/CN2017/092417 dated Sep. 27, 2017.
Examinatian report issued in corresponding Indian application No. 201734027938 dated Feb. 20, 2020.

* cited by examiner

HOUSING, METHOD FOR MANUFACTURING HOUSING, AND MOBILE TERMINAL HAVING HOUSING

CROSS-REFERENCE TO RELATED APPLICATION(S)

The present application claims priority to Chinese Patent Application No. 201610643272.2 filed on Aug. 8, 2016, and Chinese Utility Model Application No. 201620854528.X filed on Aug. 8, 2016, contents of both of which are hereby incorporated by reference in their entireties.

TECHNICAL FIELD

The present disclosure relates to electronic devices, and more particularly, to a housing for a mobile terminal, a method for manufacturing the housing, and a mobile terminal having the housing.

BACKGROUND

For the purpose of beautiful appearance and size reduction, a mobile terminal, such as a mobile phone, currently has a built-in antenna configured to transmit and receive signals. The built-in antenna requires that the mobile phone should have a housing not blocking signal transmission and reception. However, metal housings instead of plastic housings are gradually applied to mobile terminals such as mobile phones, since the metal housings have more beautiful appearances, abrasion resistance, and scratch resistance. In this case, in order to enable signal transmission and reception, a slot should be formed in the metal housing of the mobile terminal and filled with insulating material such as plastic, but the insulating material received in the slot has a color quite different from the anodized surface of the metal, which seriously destroys the unity of the housing.

DETAILED DESCRIPTION

The implementations of the present disclosure will be described in detail hereinafter. The implementations described below are exemplary and merely illustrative of the present disclosure, and are not to be construed as a limit to the present disclosure. Methods without specific technologies or conditions in the implementations are performed according to technologies or conditions described in documents in the art, or according to product specifications. Reagents or instruments of which manufacturers are not indicated are commercially available conventional ones.

Figure 3:
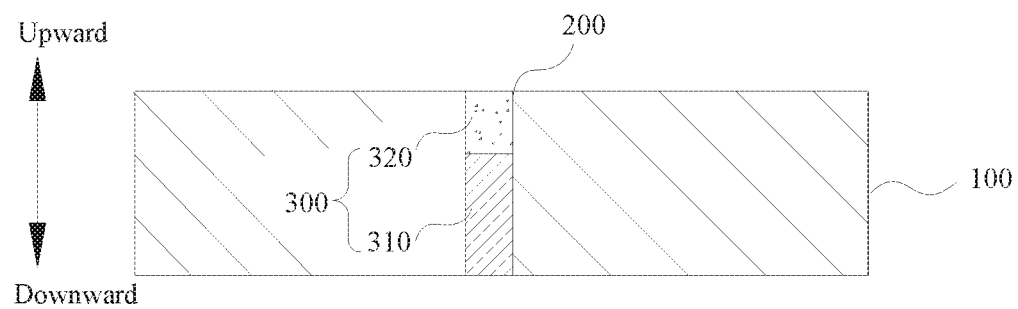
FIG. 3 is a schematic structural diagram of a housing according to an implementation of the present disclosure.

According to one aspect of the present disclosure, a housing for a mobile terminal is provided. FIG. 3 is a schematic structural diagram of a housing according to an implementation of the present disclosure. As illustrated in FIG. 3, the housing includes a substrate 100, a slot 200, and a filling layer 3.

Figure 5:
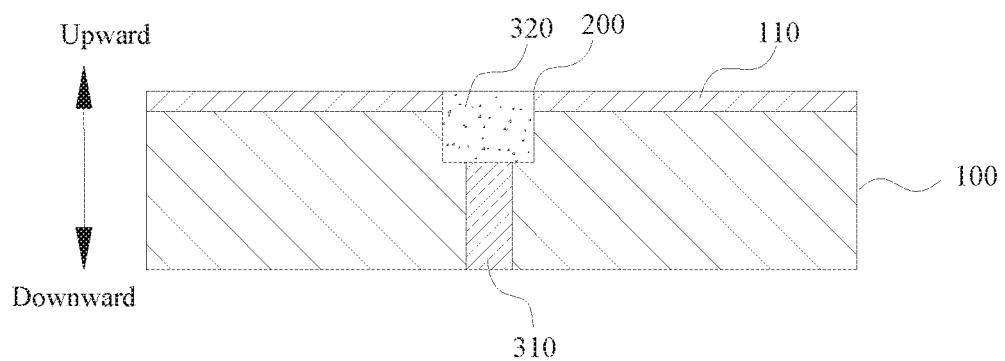
FIG. 5 is a schematic structural diagram of a housing according to yet another implementation of the present disclosure.

In one implementation of the present disclosure, the substrate 100 is made of metal. The metal used for forming the substrate 100 is not particularly limited, and may be any metal known in the art capable of being used for forming the housing of the mobile terminal, for example, the metal includes, but is not limited to, aluminum alloy and the like. The substrate 100 also has a shape not particularly limited and may be flexibly shaped by persons skilled in the art, as long as the substrate 100 can be mated with other members constituting the mobile terminal. In one implementation of the present disclosure, in order to improve surface hardness and abrasion resistance of the substrate 100, expand application scope thereof, and prolong service life thereof, the substrate 100 may be anodized. As illustrated in FIG. 5, an anodized layer 110 is formed on the outer surface (upper surface in FIG. 5) of the substrate 100.

Figure 1:
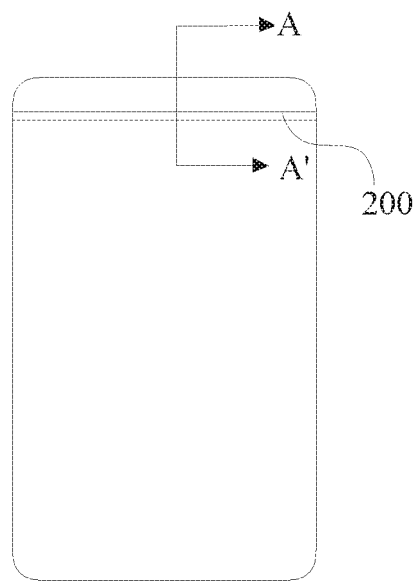
FIG. 1 is a schematic structural diagram of a mobile terminal according to an implementation of the present disclosure.
Figure 2:
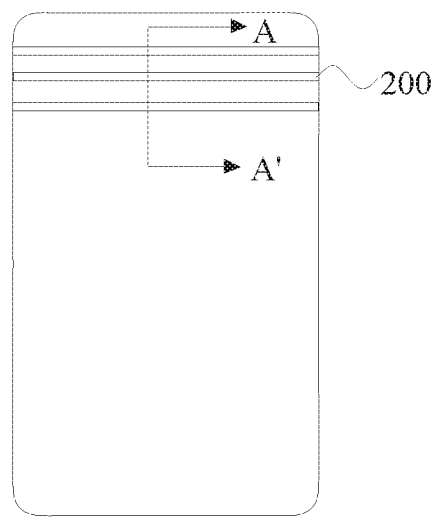
FIG. 2 is a schematic structural diagram of a mobile terminal according to another implementation of the present disclosure.
Figure 4:
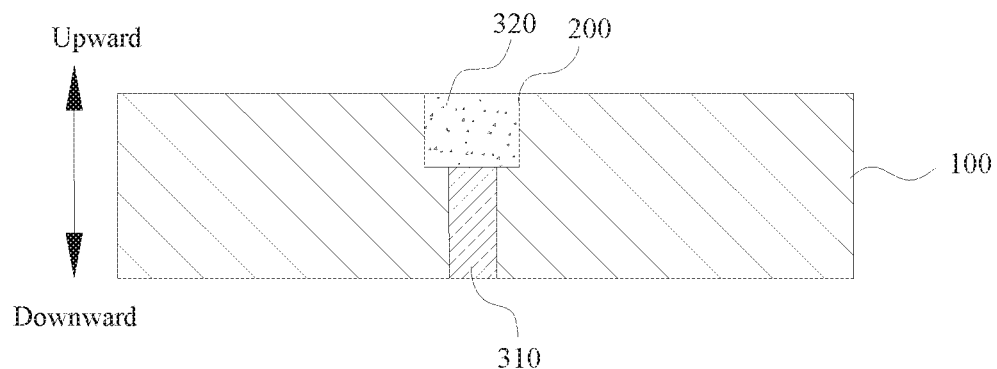
FIG. 4 is a schematic structural diagram of a housing according to another implementation of the present disclosure.

In one implementation of the present disclosure, the slot 200 penetrates through the substrate 100 in the thickness direction (the vertical direction in FIGS. 3 to 5) thereof, and is filled with the filling layer 300. The filling layer 300 includes an insulating sub-layer 310 and a printed sub-layer 320 located on the insulating sub-layer 310. In one implementation of the present disclosure, position, shape, number, etc., of the slot(s) 200 are not particularly limited, and any slot known in the art formed for the antenna is applicable here, as long as signals can be transmitted and received. The position, shape, number, etc., of the slot(s) 200 as illustrated in FIGS. 3 to 5 are exemplary and are not to be construed as a limit to the present disclosure. FIGS. 3 to 5 are schematic cross-sectional views of different structures of the slot 200 taken along an A-A' direction in FIGS. 1 and 2, while for purpose of convenience, only one slot 200 is illustrated in FIGS. 3 to 5. Actually, in one implementation of the present disclosure, the position, shape, number, etc., of the slot(s) 200 may be as illustrated in FIG. 1 or FIG. 2, as long as the position of the slot 200 is aligned with the position of the built-in antenna in the mobile terminal, to enable signal transmission and reception.

In one implementation of the present disclosure, the filling layer 300 is received in the slot 200, and includes an insulating sub-layer 310 and a printed sub-layer 320 located on the insulating sub-layer 310.

In one implementation of the present disclosure, the material used for forming the insulating sub-layer 310 is not particularly limited, and may be any insulating material known in the art, and may be flexibly customized by persons skilled in the art. In one implementation of the present disclosure, the insulating material may include, but is not limited to, polyphenylene sulfite (PPS), polybutylene terephthalate (PBT), and the like.

In one implementation of the present disclosure, the printed sub-layer 320 is located on the insulating sub-layer 310, and covers the insulating sub-layer 310. Thus, by means of rendering the color of the printed sub-layer 320 substantially the same as that of the outer surface of the substrate 100, the color difference between the slot 200 and the outer surface of the substrate 100 can be reduced conveniently and effectively, thereby improving the unity of the mobile terminal.

Generally, the slot 200 has a small size, and the thickness of the insulating sub-layer 310 may not be precisely controlled in a process of injecting insulating material to form the insulating sub-layer 310. In this case, in one implementation of the present disclosure, when manufacturing the housing, firstly, the slot 200 may be filled with the insulating material used for forming the insulating sub-layer 310; secondly, the insulating material received in the slot 200 is cut with processes including, but not limited to, a Computer Numerical Control (CNC) machining, and the upper part of the insulating material (adjacent to the outer surface of the substrate 100) is removed so as to form the insulating sub-layer 310 in the lower part of the slot 200 and a groove in the upper part of the slot 200; thirdly, the groove is filled with the printed sub-layer 320. The groove has the same width as the insulating sub-layer 310, and thus the printed sub-layer 320 received in the groove also has the same width as the insulating sub-layer 310, as illustrated in FIG. 3.

In one implementation of the present disclosure, when the upper part of the insulating material is removed, the metal adjacent to the upper part of the insulating material in the width direction (the vertical direction in FIGS. 1 to 2 and the horizontal direction in FIGS. 3 to 5) of the slot 200 may also be removed, and consequently, a groove having a width larger than the insulating sub-layer 310 is formed in the upper part of the slot 200. Thus, the printed sub-layer 320 received in the groove also has a width larger than the insulating sub-layer 310 in the lower part of the slot 200, as illustrated in FIG. 4, thereby ensuring that the printed sub-layer 320 fully covers the insulating sub-layer 310, and avoiding the exposure of a part of the insulating sub-layer 310 which affects the unity of the mobile terminal. The exposure of a part of the insulating sub-layer 310 may be due to operation errors arising when the printed sub-layer 320 is disposed. In one implementation of the present disclosure, the width of the printed sub-layer 320 is 0.02-0.06 mm larger than the width of the insulating sub-layer 310.

In one implementation of the present disclosure, when the width of the printed sub-layer 320 is larger than that of the insulating sub-layer 310, the center of the printed sub-layer 320 may be aligned with the center of the insulating sub-layer 310 in the thickness direction of the substrate 100, or may be misaligned to some extent, as long as the printed sub-layer 320 can fully cover the insulating sub-layer 310.

In one implementation of the present disclosure, the printed sub-layer 320 may have a thickness of 0.1-0.3 mm which is appropriate since the color of the printed sub-layer 320 may be affected if the thickness thereof is less than 0.1 mm while some of the material of the printed sub-layer 320 may be unnecessary if the thickness thereof is larger than 0.3 mm.

In one implementation of the present disclosure, the material used for forming the printed sub-layer 320 and the way of disposing of the printed sub-layer 320 are not particularly limited. In one implementation of the present disclosure, the printed sub-layer 320 may be formed of a polymer film subjected to a printing process and is fixed on the insulating sub-layer 310 by adhesive. The polymer forming the polymer film is also not particularly limited, and may be any polymer the color of which can be changed by printing, and may be flexibly customized by persons skilled in the art. For example, in one implementation of the present disclosure, the polymer film may be formed from at least one selected from a group consisting of polyethylene terephthalate (PET), polymethyl methacrylate (PMMA), and polycarbonate (PC). For example, in one implementation of the present disclosure, the polymer film may be formed from PET, or may be formed from a composite material consisting of PMMA and PC. The polymer film formed from the above-mentioned polymer has a fine printing effect, thereby further improving the uniformity between the outer surface of the polymer film in the slot 200 and the metal substrate 100.

Furthermore, in one implementation of the present disclosure, the polymer film has a structure not particularly limited. For example, in one implementation of the present disclosure, the transparent polymer film formed of PET may have a high gloss surface and a matte surface. The high gloss surface has been subjected to the printing process, and is in contact with the insulating sub-layer 310, while the matte surface is exposed outside. In order to facilitate mass manufacture, firstly, the film is manufactured with the above-mentioned polymer, and cut to size suitable for printing, and then the color of the film is rendered the same as the substrate 100 by printing, for example, the color may be gold, pale pink, silver, or the like. After that, the polymer film with a printed color is punched to form one or more printed sub-layers 320 having a size suitable for being received in the groove. The adhesive formed from, for example, polyurethane or the like is disposed on the insulating sub-layer 310, and the printed sub-layer 320 having the suitable size is attached and fixed in the groove.

It should be noted that, in the present disclosure, "same", "color is the same", "same color", and the like should be broadly understood, that is to say, these expressions not only mean that the printed sub-layer 320 has exactly the same color as the substrate 100, but also mean that the printed sub-layer 320 and the substrate 100 have no obvious difference in their colors. In the present disclosure, the above-mentioned expressions indicate that the color of the printed sub-layer 320 subjected to the printing process is close to the color of the metal substrate. Compared with conventional insulating material received in the slot 200 and not subjected to the printing process, the printed sub-layer 320 and the substrate 100 have no obvious difference in their colors when observed by human eyes.

It should be noted that, in the present disclosure, the conditions of the printing process to which the polymer film forming the printed sub-layer 320 is subjected are not particularly limited, and may be customized by those skilled in the art according to the type of the polymer and the color of the anodized outer surface of the substrate 100. For example, in one implementation of the present disclosure, firstly, a black color may be printed on the polymer film, and then the polymer film may be subjected to one or more black/white color printing processes, thereby rendering the printed color of the initially transparent polymer film more obvious.

In one implementation of the present disclosure, in order to further improve the abrasion resistance of the surface of the printed sub-layer 320 formed of the polymer film, a protective paint layer may be disposed on the polymer film.

According to the present disclosure, the printed sub-layer 320 is disposed in the housing, and by adjusting the color of the printed sub-layer 320, the color of the printed sub-layer 320 can be effectively and conveniently rendered substantially the same as that of the outer surface of the substrate 100, thereby obviously reducing the color difference between the slot 200 and the substrate 100, and significantly improving the unity of the mobile terminal.

Figure 6A:
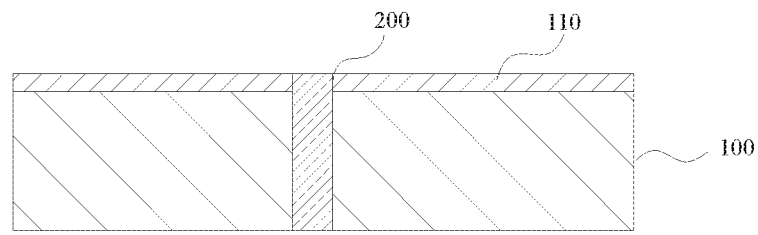
FIG. 6A is an operation of a flowchart of manufacturing a housing of a mobile terminal according to an implementation of the present disclosure.
Figure 6B:
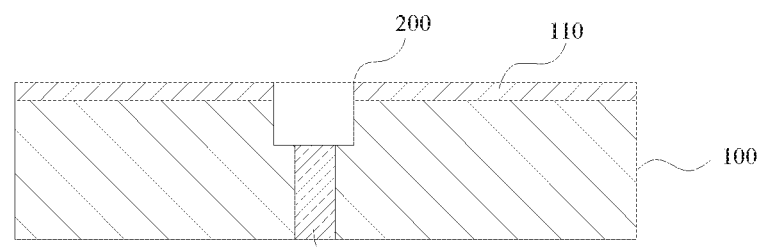
FIG. 6B is another operation of a flowchart showing an operation of manufacturing a housing of a mobile terminal according to an implementation of the present disclosure.
Figure 6C:
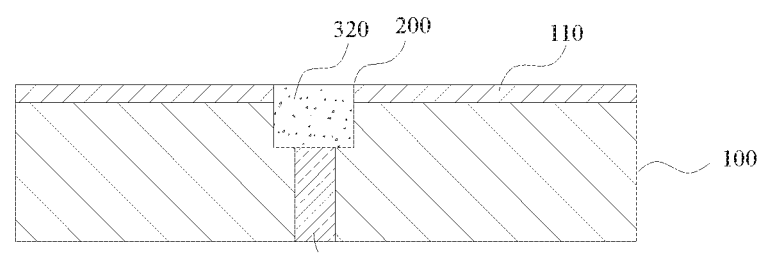
FIG. 6C is another operation of a flowchart showing an operation of manufacturing a housing of a mobile terminal according to an implementation of the present disclosure.

According to another aspect of the present disclosure, a method for manufacturing a housing is provided. FIGS. 6A-6C are operations of a flowchart of manufacturing a housing of a mobile terminal in one implementation of the present disclosure. Referring to FIGS. 6A-6C, the method is described below.

FIG. 6A shows that a substrate used for the housing is manufactured.

In one implementation of the present disclosure, a slot 200 is formed in a substrate 100, and the slot 200 penetrates through the substrate 100 in the thickness direction (the vertical direction in FIGS. 6A-6C) of the substrate 100, and is filled with insulating material.

In one implementation of the present disclosure, the substrate 100 is made of metal. The metal used for forming the substrate 100 is not particularly limited, and may be any metal known in the art capable of being used for forming the housing of the mobile terminal, for example, the metal includes, but is not limited to, aluminum alloy and the like. The substrate 100 also has a shape not particularly limited and may be flexibly shaped by persons skilled in the art, as long as the substrate 100 can be mated with other members constituting the mobile terminal. In one implementation of the present disclosure, in order to improve surface hardness and abrasion resistance of the substrate 100, expand application scope thereof, and prolong service life thereof, the substrate 100 may be anodized, and consequently, an anodized layer 110 is formed on the outer surface of the substrate 100 before the slot 200 is formed.

In one implementation of the present disclosure, the processes for manufacturing the substrate 100 used for the housing is not particularly limited, and any processes known in the art which are capable of manufacturing the substrate 100 may be adopted. In one implementation of the present disclosure, a process for manufacturing the substrate 100 used for the housing includes, but is not limited to, conventionally molding the substrate 1, forming the slot 200 penetrating through the substrate 100 by etching, lasing, CNC machining, or the like, and filling the slot 200 with the insulating material by injection molding (e.g., Nano Molding Technology (NMT)) or the like. After the slot 200 is formed, the substrate 100 may be further polished, sandblasted, and anodized.

FIG. 6B shows that an insulating sub-layer is formed.

In one implementation of the present disclosure, the insulating material is cut with a CNC machining, and the upper part of the insulating material (adjacent to the outer surface of the substrate 100) is removed. Consequently, the remaining insulating material forms an insulating sub-layer 310 in the lower part of the slot 200 and a groove is formed in the upper part of the slot 200. The insulating sub-layer 310 has the same width as the slot 200, and the groove has the same width as the insulating sub-layer 310.

In one implementation of the present disclosure, when the upper part of the insulating material is removed, the metal adjacent to the upper part of the insulating material in the width direction (the horizontal direction in FIGS. 6A-6C) of the slot 200 may also be removed, and consequently, a groove having a width larger than the insulating sub-layer 310 is formed on the insulating sub-layer 310.

Generally, the slot 200 has a small size, and the thickness of the insulating material may not be precisely controlled in a process of injecting insulating material into the slot 200. Hence, the difficulty of manufacturing the housing is greatly increased when firstly the insulating sub-layer 310 having a thickness smaller than the depth of the slot 200 is injected in the slot 200 and then the polymer on which the color is easy to print is disposed on the insulating sub-layer 310 in the slot 200. Compared with it, the difficulty is greatly reduced when firstly the slot 200 is filled with the insulating material and then the upper part of the insulating material as well as the metal adjacent to it is removed to form the groove. Thus, not only the width of the groove can be flexibly controlled, but also the insulating material overflowing from the slot 200 can be removed. In one implementation of the present disclosure, the processes for forming the groove are not particularly limited, and may be flexibly customized by persons skilled in the art. In one implementation of the present disclosure, the processes for forming the groove includes, but are not limited to, a CNC machining which enables simple and convenient operation, has high efficiency, a high yield, a low cost, and is suitable for mass manufacture.

In one implementation of the present disclosure, when the width of the groove is larger than that of the slot 200, the center of the groove may be aligned with the center of the slot 200 in the thickness direction of the substrate 100, thereby ensuring that a printed sub-layer 320 received in the groove fully covers the insulating sub-layer 310, and avoiding the exposure of a part of the insulating sub-layer 310 which affects the unity of the mobile terminal.

FIG. 6C shows that a printed sub-layer is disposed.

In one implementation of the present disclosure, the printed sub-layer 320 is formed on the insulating sub-layer 310. That is to say, the printed sub-layer 320 is disposed in the groove formed with a CNC machining, etc. In one implementation of the present disclosure, the printed sub-layer 320 may be formed of a polymer film subjected to a printing process and is fixed in the groove by adhesive. The polymer forming the polymer film is also not particularly limited, and may be any polymer the color of which can be changed by printing, and may be flexibly customized by persons skilled in the art. For example, in one implementation of the present disclosure, the polymer film may be formed from at least one selected from a group consisting of polyethylene terephthalate (PET), polymethyl methacrylate (PMMA), and polycarbonate (PC). For example, in one implementation of the present disclosure, the polymer film may be formed from PET, or may be formed from a composite material consisting of PMMA and PC. The polymer film formed from the above-mentioned polymer has a fine printing effect, thereby further improving the uniformity between the outer surface of the polymer film in the slot 200 and the metal substrate 100.

Furthermore, in one implementation of the present disclosure, the polymer film has a structure not particularly limited. For example, in one implementation of the present disclosure, the transparent polymer film formed of PET may have a high gloss surface and a matte surface. The high gloss surface has been subjected to the printing process, and is in contact with the insulating sub-layer 310, while the matte surface is exposed outside. In order to facilitate mass manufacture, firstly, the film is manufactured with the above-mentioned polymer, and cut to size suitable for printing, and then the color of the film is rendered the same as the substrate 100 by printing, for example, the color may be gold, pale pink, silver, or the like. After that, the polymer film with a printed color is punched to form one or more printed sub-layers 320 having a size suitable for being received in the groove. The adhesive formed from, for example, polyurethane or the like is disposed on the insulating sub-layer 310 in the groove, and the printed sub-layer 320 having the suitable size is attached and fixed in the groove.

In one implementation of the present disclosure, the printed sub-layer 320 may have a width 0.02-0.06 mm larger than the insulating sub-layer 310. In this way, the likelihood that the insulating sub-layer 310 is not fully covered due to operation errors can be greatly reduced or avoided. That is to say, it can also be ensured that the insulating sub-layer 310 is fully covered, even if a location misalignment arises to some extent when the groove is formed.

In one implementation of the present disclosure, the printed sub-layer 320 may have a thickness of 0.1-0.3 mm which is appropriate since the color of the printed sub-layer 320 may be affected if the thickness thereof is less than 0.1 mm while some of the material of the printed sub-layer 320 may be unnecessary if the thickness thereof is larger than 0.3 mm.

It should be noted that, in the present disclosure, the conditions of the printing process to which the polymer film forming the printed sub-layer 320 is subjected are not particularly limited, and may be customized by those skilled in the art according to the type of the polymer and the color of the anodized outer surface of the substrate 100. For example, in one implementation of the present disclosure, firstly, a black color may be printed on the polymer film, and then the polymer film may be subjected to one or more black/white color printing processes, thereby rendering the printed color of the initially transparent polymer film more obvious.

In one implementation of the present disclosure, in order to further improve the abrasion resistance of the surface of the printed sub-layer 320 formed of the polymer film, a protective paint layer may be disposed on the polymer film.

According to the present disclosure, by means of the method, the printed sub-layer 320 covering the insulating sub-layer 310 can be formed in the slot 200, and by adjusting the color of the printed sub-layer 320, the color of the printed sub-layer 320 can be effectively and conveniently rendered substantially the same as that of the outer surface of the substrate 100, thereby obviously reducing the color difference between the slot 200 and the substrate 100, and significantly improving the unity of the mobile terminal.

According to yet another aspect of the present disclosure, a mobile terminal having the foregoing housing and an antenna is provided. The slot of the housing is aligned with the antenna. In one implementation of the present disclosure, the mobile terminal may be a device requiring signal transmission and reception, such as a mobile phone. It should be noted that, the slots 200 as illustrated in FIGS. 1 and 2 are merely intended to show the locations of the slots 200 on the outer surface of the housing, and are not to be construed as having an obvious difference in appearance from the other part of the housing. Actually, the printed sub-layer 320 subjected to the printing process is received in the slot 200 in the housing as illustrated in FIGS. 1 and 2, and thus, the slot 200 has substantially the same appearance as the substrate 100 having an anodized outer surface.

According to the present disclosure, the mobile terminal has a beautiful appearance, abrasion resistance, and the housing of the mobile terminal has the slot having substantially the same appearance as the metal substrate.

Technical solutions of the present disclosure will be described in detail in conjunction with examples hereinafter. It will be appreciated by persons skilled in the art that, the examples described below are merely to explain the present disclosure, and are not to be construed as a limit to the present disclosure. Methods without specific technologies or conditions in the examples are performed according to technologies or conditions described in documents in the art, or according to product specifications. Reagents or instruments of which manufacturers are not indicated are commercially available conventional ones.

EXAMPLE 1

Aluminum alloy material is processed by casting, pressing, and a CNC machining, so as to manufacture a substrate with a slot penetrating through the substrate in the thickness direction of the substrate. Insulating material is injected into the slot. Then the substrate is decontaminated, degreased, subjected to an alkali corrosion process, washed with water, neutralized in a neutralization tank, and washed with water again so as to remove contamination on the outer surface of the substrate.

The outer surface of the substrate is polished, so as to improve the metallic texture of the substrate. After that, the outer surface of the substrate is sandblasted and wiredrawn. Then, the outer surface of the substrate is anodized, so as to form a golden appearance.

A groove used for forming a printed sub-layer subsequently is formed in the upper part of the slot with the CNC machining. The remaining insulating material in the lower part of the slot forms an insulating sub-layer. The groove has a thickness of 0.2 mm, the same width and length as the slot.

A high gloss surface of a transparent PET film is subjected to a printing process, and a golden color is printed on the high gloss surface of the PET film. Then, the PET film is punched to form one or more polymer strips having a size suitable for being received in the groove.

Polyurethane is injected into the groove with a nozzle having an inner diameter of 0.1 mm, and a continuous adhesive layer is formed at the bottom of the groove. The polymer strip (the matte surface facing upward, the high gloss surface facing downward) is placed into the groove, pressed and fixed, so as to form the printed sub-layer.

EXAMPLE 2

The example 2 is similar to the example 1, and differs in that a silver appearance of a substrate is formed by anodizing, and a groove having a thickness of 0.2 mm, the same length as the slot, and a width 0.04 mm larger than the slot is formed on the insulating sub-layer; the center of the groove is aligned with the center of the slot, and each side of the groove is 0.02 mm beyond the slot; a silver color is printed on the PET film.

In the description of the present disclosure, it should be understood that, orientational or positional relationships indicated by the terms "central", "length", "width", "thickness", "upper", "lower", "inside", "outside", and the like are those as illustrated in accompanying drawings, and are merely for facilitating and simplifying the description of the present disclosure, rather than indicating or implying that the mentioned devices or elements should have specific orientations and should be constructed and operated in specific orientations, and thus cannot be construed as a limit to the present disclosure. The term "outer surface" refers to a surface of a member or structure, such as a housing, facing the outside circumference, while the term "inner surface" refers to a surface of a member or structure, such as a housing, facing the inside of a mobile terminal.

In the present disclosure, unless specified otherwise, the terms "mount", "connect", "couple", "fix", and the like should be broadly understood, and may include, for example, an un-detachable connection, a detachable connection, an integral connection, a mechanical connection, an electrical connection, a direct connection, an indirect connection via an intermediate medium, a communication between two elements, and an interaction relationship between two elements. For persons skilled in the art, the specific meaning of the foregoing terms in the present disclosure should be understood in light of the specific circumstance.

In the present disclosure, unless specified otherwise, the first feature being "on" or "beneath" the second feature may mean that the first feature may be in direct contact with the second feature, or the first feature may be in indirect contact with the second feature via an intermediate medium. Moreover, the first feature being "on", "over" or "above" the second feature may mean that the first feature is over or above the second feature, or merely mean that the first feature has a horizontal level higher than the second feature. The first feature being "beneath", "under" or "below" the second feature may mean that the first feature is under or below the second feature, or merely mean that the first feature has a horizontal level lower than the second feature.

In the description of this specification, the terms "one implementation", "some implementations", "example", "embodiment", "some examples", or the like are intended to mean that specific features, structures, materials, or characteristics described in conjunction with the implementation or example are included in at least one implementation or example of the present disclosure. In the specification, the exemplary description for the foregoing terms does not necessarily refer to the same implementations or examples. Moreover, the described specific features, structures, materials, or characteristics may be combined in an appropriate way in any one or more implementations or examples. Furthermore, when not conflicting, different implementations or examples described in the specification as well as features in the different implementations or examples may be integrated or combined by persons skilled in the art.

Although the implementations of the disclosure have been illustrated and described above, it should be understood that the foregoing implementations are exemplary and are not to be construed as a limit to the present disclosure. Without departing from the scope of the present disclosure, changes, modifications, substitutions, and variations could be made to the foregoing implementations by persons skilled in the art.

What is claimed is:

1. A housing, comprising:
   a substrate, made of metal;
   at least one slot, penetrating through the substrate in a thickness direction of the substrate; and
   a filling layer, received in the at least one slot, and comprising an insulating sub-layer and a printed sub-layer located on the insulating sub-layer, wherein:
   the printed sub-layer is formed of a polymer film subjected to a printing process;
   the printed sub-layer has the same color as an outer surface of the substrate;
   the polymer film has a high gloss surface and a matte surface; and
   the high gloss surface has been subjected to the printing process and is in contact with the insulating sub-layer while the matte surface is exposed outside.

2. The housing of claim 1, wherein the printed sub-layer has the same width as the insulating sub-layer.

3. The housing of claim 1, wherein the printed sub-layer has a width larger than the insulating sub-layer; and wherein a center of the printed sub-layer is aligned with a center of the insulating sub-layer in the thickness direction of the substrate.

4. The housing of claim 3, wherein the width of the printed sub-layer is 0.02-0.06mm larger than the width of the insulating sub-layer.

5. The housing of claim 1, wherein the printed sub-layer has a thickness of 0.1-0.3mm.

6. The housing of claim 1, wherein the printed sub-layer is attached on the insulating sub-layer by adhesive.

7. The housing of claim 1, wherein the polymer film is formed from at least one selected from a group consisting of PET, PMMA, and PC.

8. The housing of claim 1, wherein an anodized layer is formed on an outer surface of the substrate.

9. The housing of claim 8, wherein the printed sub-layer is formed of a polymer film subjected to a printing process, and the printed sub-layer has the same color as the outer surface of the anodized layer.

10. The housing of claim 9, wherein the polymer film is formed from at least one selected from a group consisting of PET, PMMA, and PC.

11. A mobile terminal, comprising a housing and an antenna, wherein the housing comprises:
    a substrate made of metal;
    at least one slot penetrating through the substrate in a thickness direction of the substrate; and
    a filling layer received in the at least one slot, comprising an insulating sub-layer and a printed sub-layer located on the insulating sub-layer, wherein:
    the printed sub-layer is formed of a polymer film subjected to the printing process;
    the printed sub-layer has the same color as an outer surface of the substrate;
    the polymer film has a high gloss surface and a matter surface; and
    the high gloss surface has been subjected to the printing process and is in contact with the insulating sub-layer while the matte surface is exposed outside; and
    wherein the at least one slot is aligned with the antenna.

12. The mobile terminal of claim 11, wherein the printed sub-layer has a width larger than the insulating sub-layer and wherein a center of the printed sub-layer is aligned with a center of the insulating sub-layer in the thickness direction of the substrate.

* * * * *